Jan. 12, 1943.  D. L. ELLIS  2,307,829
CITRUS FRUIT PARER
Filed Aug. 4, 1942  3 Sheets-Sheet 1
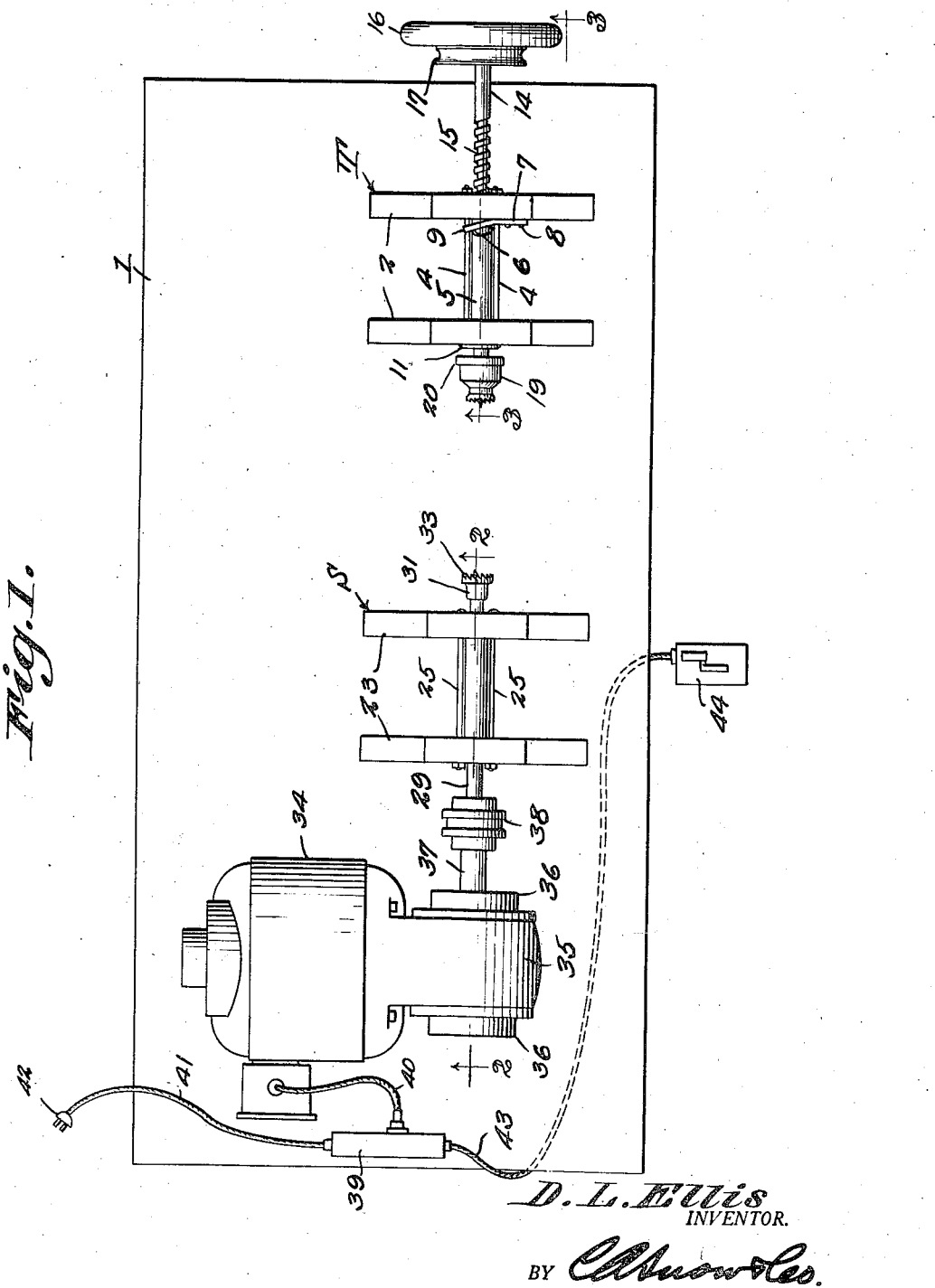
D. L. Ellis
INVENTOR.
BY Jan. 12, 1943. D. L. ELLIS 2,307,829
CITRUS FRUIT PARER
Filed Aug. 4, 1942 3 Sheets-Sheet 2
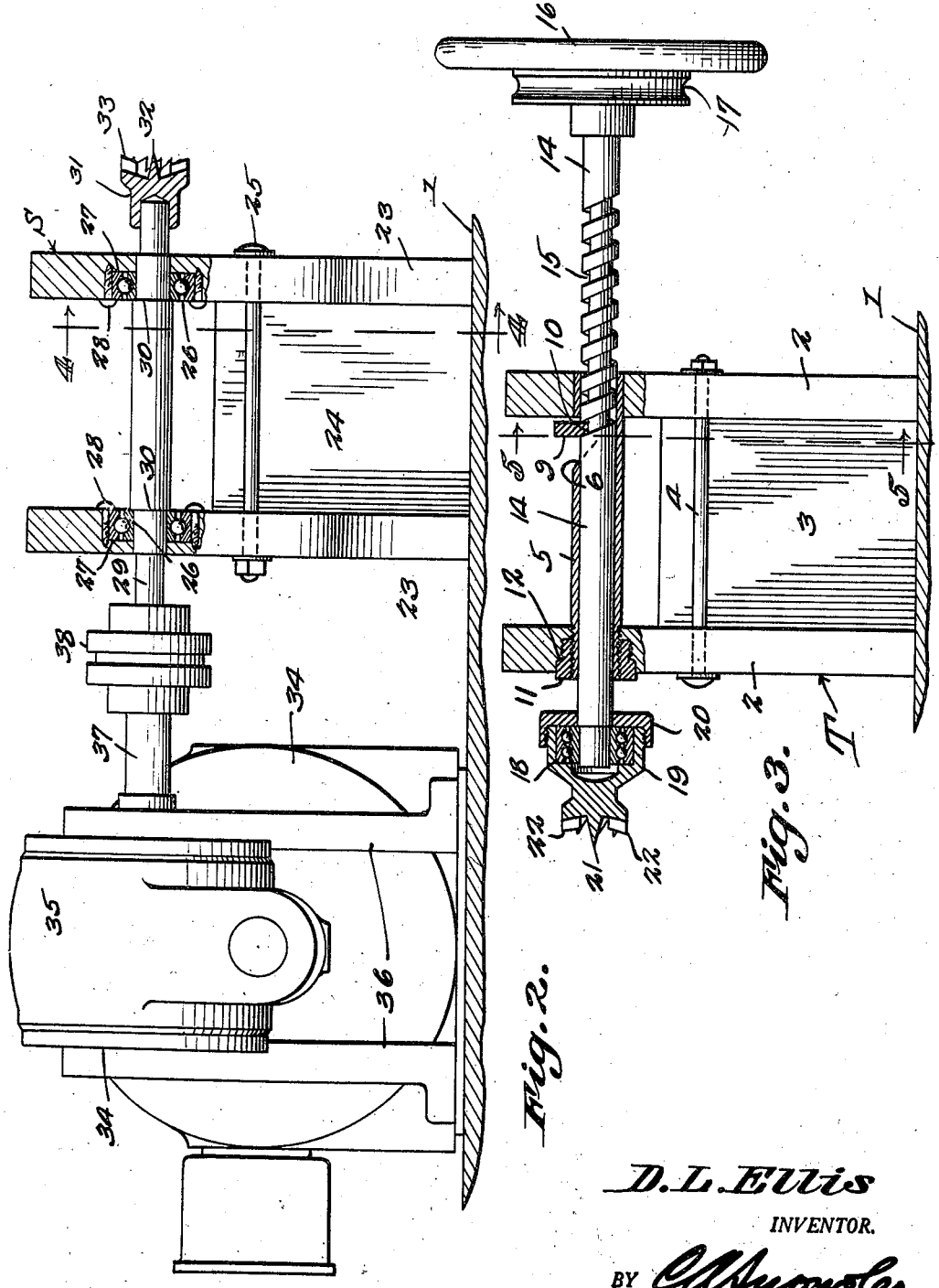
D. L. Ellis
INVENTOR.
BY Knowles

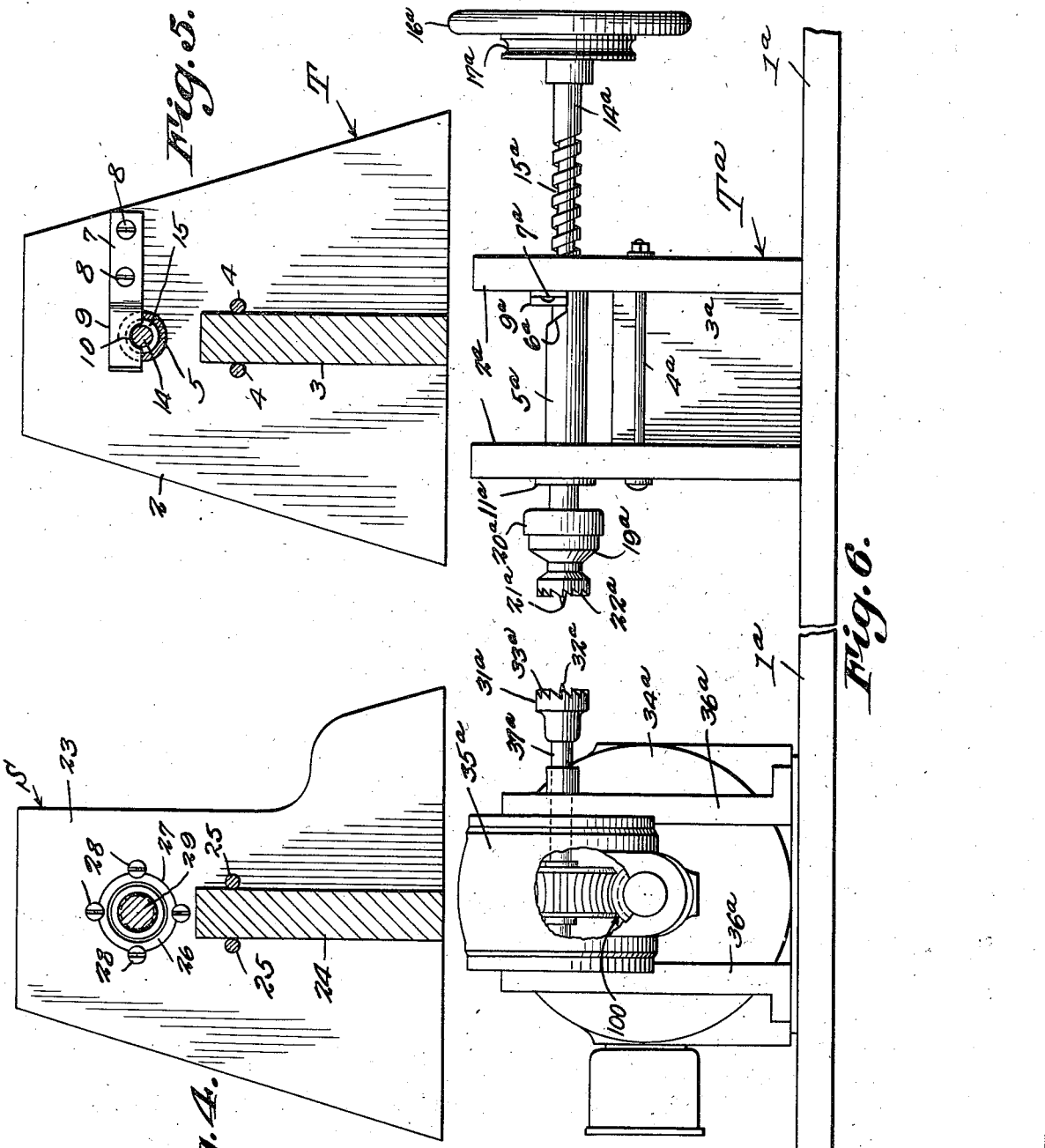

Patented Jan. 12, 1943

2,307,829

UNITED STATES PATENT OFFICE 2,307,829

CITRUS FRUIT PARER

David L. Ellis, Seattle, Wash., assignor to Kwintupl Marmalade Co., Seattle, Wash., a partnership composed of himself and Paul G. Ellis Application August 4, 1942, Serial No. 453,582

8 Claims. (Cl. 146—3)

Broadly considered, this invention aims to provide a novel machine for removing, by a paring operation, the outer, bitter, oil cells from citrus fruits, particularly grapefruit, oranges and lemons, without puncturing the pulp or inner juice cells of the fruit.

A further object of the invention is to produce a paring machine which will hold all sizes of citrus fruits, and rotate them at such speed that an operator may remove the outer, bitter portion to a uniform thickness of approximately one-sixteenth of an inch, for example.

The device is adapted to be used in connection with a hand-held paring tool (not shown), having a blade provided with a sharp cutting edge which removes a paring of a predetermined thickness, due to the provision of a gauge which cooperates with the blade. The thickness of the amount removed depends upon the thickness of the bitter peel of the particular fruit which is being pared. The tool is held in the hand of an operator in such manner that it will follow the contour of the surface of the fruit, which in some cases is not symmetrical or spherical.

As to the structural features of the device, it comprises a power unit, preferably a gear-head electric motor, provided with a suitable worm gear for reducing the speed of rotation.

The intermittent starting and stopping of the motor is controlled by a foot switch or any preferred form and disposed on the floor, in convenient position for actuation by an operator, the shaft of the motor being connected by a flexible coupling to the headstock or power unit of the machine, if desired.

A tailstock or adjusting unit coacts with the headstock and includes an idler chuck for holding the fruit in position against the driving chuck of the headstock. The tailstock shaft is provided with a worm screw and with a hand wheel for adjusting the chucks to the proper position for gripping and holding fruits of different sizes whilst they are being rotated during the paring operation.

The invention aims to provide a device of the class described in which an automatic cutting device is not used, such devices being impractical, since the fruit is not of uniform shape and size.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, in top plan, a device constructed in accordance with the invention;

Fig. 2 is a section on the line 2—2 of Fig. 1, most parts being in elevation;

Fig. 3 is a section on the line 3—3 of Fig. 1, parts remaining in elevation;

Fig. 4 is a section on the line 4—4 of Fig. 2;

Fig. 5 is a section on the line 5—5 of Fig. 3;

Fig. 6 is a side elevation showing a modified form of the invention, parts being broken away.

In carrying out the invention as shown in Figs. 1 to 5, there is provided a bed plate 1, which may be of any desired construction. The bed plate, like many other parts of the device, may be made of wood, since, at this time (1942), there is a shortage of metal. Metal, however, may be substituted for wood, if desired and feasible.

A tailstock T is secured to the bed plate 1, and is so constructed that it may be made for the most part out of wood, if the manufacturer desires. The tailstock T comprises standards 2, in the form of transverse, parallel, plate-like members, between which is disposed a spacer 3, in the form of a plate, engaged at its lower end with the bed plate 1, and extended upwardly more than half way of the height of the standards. The spacer 3 is located midway between the lateral edges of the standards 2. Securing elements 4, such as draw bolts, extend through the standards 2, on opposite sides of the spacer 3, and bear against the spacer throughout their lengths, as shown in Fig. 5.

The standards 2 and the spacer 3 are held together by the draw bolts 4, and the tailstock T may be secured to the bed plate 1, in any preferred manner.

A tubular bearing sleeve 5 extends through the standards 2 and is held therein by a tubular nut 11, which, as shown in Fig. 3, is threaded into the innermost of the standards 2, the nut being threaded upon the sleeve 5. The nut 11 has a transverse shoulder 12, which causes the nut to be seated firmly in the aforesaid standard 2. Near to the outermost standard 2, the sleeve 5 is supplied with an opening 6. A transverse follower plate 7 (Fig. 5) is attached by securing elements 8, to the inner surface of the outermost standard 2, and has a finger 9, inclined slightly with respect to the body portion of the follower plate 7. The finger 9 enters the opening 6 in the sleeve 5 and has a semi-circular notch 10 in its lower edge.

A tail arbor 14 is mounted to rotate and to move longitudinally in the bearing sleeve 5, the tail arbor having a quick thread 15, the threaded portion of the tail arbor being received in the notch 10 of the finger 9. The lateral inclination of the finger 9 with regard to the body portion of the follower plate 7, causes the finger to cooperate properly with the pitch of the thread 15.

A means is provided for advancing the tail arbor 14, at the will of an operator, when the tail arbor is rotated relatively to the finger 9 of the follower plate 7. That means may be a hand wheel 16, secured to the outer end of the arbor. If an intermittently operable means is available for rotating the arbor 14 by power, recourse is had to a belt pulley 17, incorporated in the hand wheel 16.

The inner end of the tail arbor 14 enters and is secured to the inner ring of a ball bearing 18, the outer ring of which is secured within a hollow tail chuck 19, a cap 20 being threaded on the tail chuck, the tail arbor 14 passing through the chuck. The construction is such that the tail chuck can rotate with respect to the arbor 14, the arbor being held against rotation (saving when operated by the wheel 16) because of the frictional engagement between the finger 9 of the follower plate 7 and the thread 15 of the arbor. The tail chuck 19 has a central spur 21, and teeth 22, disposed about the spur. There may be any desired number of these teeth 22 and they have a one-way slant, in order to secure a good hold on the piece of fruit which is to be rotated. The teeth 22 are short enough so that they do not puncture the inner cells of the fruit peel.

A headstock S is secured to the bed plate 1 and, in some respects, resembles the tailstock T closely. To that extent, the description of the headstock S may be reduced to a catalogue of parts. It comprises standards 23, a spacer 24, and draw bolts 25.

Ball bearings 26 are disposed in facing recesses 27 formed in the standards 23, the outer rings of the ball bearings being held fixed in the standards by securing members 28, such as screws threaded into the standards, the heads of the screws overlapping the outer rings of the ball bearings.

The inner rings of the ball bearings 26 preferably have a driving fit on the arbor 29 and rotate with it. Owing to the presence of the spacer 24, when the draw bolts 25 are tightened, the inner rings of the ball bearings 26 will not be bound tightly between the shoulders 30 and the opposed portions of the standards 26, it being clear that it would be idle to cause the inner rings to rotate with the arbor 29, and at the same time have the outer ends of the rings bound tightly against the standards.

A head arbor 29 is mounted to rotate in the ball bearings 26, and is shouldered as at 30, for engagement with the inner rings of the ball bearings. The construction is such that, although the head arbor 29 can rotate freely, it cannot move longitudinally.

To the inner end of the head arbor 29 is secured a head chuck 31, having a central spur 32 and teeth 33, corresponding to the teeth 22 and the spur 21 of the tail chuck 19.

Rotation may be imparted to the head arbor 29 in any appropriate way, for instance by means of an electric motor 34 of selected construction, secured to the base plate 1, to one side of the axis of rotation of the tail arbor 14 and the head arbor 29. The motor 34 includes a casing 35, secured between posts 36 on the bed plate 1. Within the casing 35 is journaled a shaft 37, in alinement with the head arbor 29, the shaft being connected to the arbor by a flexible coupling 38. The shaft of the motor 34 is at right angles to the shaft 37, and, therefore, within the casing 35 is located any appropriate gearing, such as that indicated at 100 in Fig. 6, whereby rotation may be imparted to the shaft 37, from the motor shaft. The motor installation, described in detail, may be departed from should the manufacturer desire.

A junction box is shown at 39, an electric cable 40 leads to and from the motor 34. A cable 41 is assembled with the junction box 39 and may be plugged at 42, into a source of power. From the junction box 39, a cable 43 leads to a foot switch 44 on the floor of the establishment wherein the device is used, the foot switch being placed in any desired position so that an operator may actuate it with his foot, both hands being left free, to carry on the paring operation which takes place between the chucks 19 and 31.

The machine is adapted to handle fruit of any size, within reasonable limits. Through the instrumentality of the hand wheel 16, the tail arbor 14 is rotated, and the finger 9 of the follower plate 7, cooperating with the thread 15, causes the tail arbor to advance, the fruit being gripped securely between the chucks 19 and 31. If desired, the tail arbor 14 may be advanced to put sufficient pressure on the fruit, so that the fruit will belly out, circumferentially, thereby compacting the fruit and making it more solid, to the end that the fruit may work better when a hand operated paring device (not shown) is applied to it.

The tail chuck 19 rotates freely on the tail arbor 14, but the head chuck 31 is secured to the head arbor 29, for rotation therewith, the head arbor deriving rotation through the flexible coupling 38, the shaft 37, the gearing in the casing 35, and the motor 34. The coupling 38 takes care of minor irregularities in alinement between the shaft 37 and the head arbor 29, and it may yield a little, circumferentially, to take the starting shock off the arbor 29, when initial rotation is imparted to the shaft 37.

The operator places himself conveniently with respect to the fruit that is between the chucks 31 and 19, and removes the bitter, outer portion of the rind, by means of the aforesaid, hand-operated tool (not shown) as the fruit is rotated. The starting and stopping operation may be brought about conveniently, through the instrumentality of the pedal switch 44. The portion of the rind that is covered by the working faces of the chucks 19 and 31 may be removed by a slice or two with a hand-operated knife, such as the hand-operated tool hereinbefore described, after the fruit has been taken out from between the chucks.

In the modification shown in Fig. 6, parts hereinbefore described have been designated by numerals already used, with the suffix "a." In this form of the invention, the headstock S, the head arbor 29 and the flexible coupling 38 are omitted, the head chuck 31a being secured directly to the shaft 37a. The construction of Fig. 6 enables the bed 1a to be shorter than the bed 1. The gearing which connects the shaft 37a with the motor shaft is indicated at 100.

The device, in either of its forms, is simple in construction, and will be found capable of ready adjustment, to hold fruit, such as citrus fruit, and to impart rotation thereto, as and for the purpose described.

What is claimed is:

1. In a machine for rotating citrus fruit during the removal of the outer, bitter cells thereof, a bed, a tailstock secured to the bed and comprising standards, a spacer disposed between the standards, tightening devices connecting the standards and binding them against the ends of the spacer, the tightening devices being disposed on opposite sides of the spacer, in contact therewith, a tail arbor carried by the standards for rotation, and having a thread, means mounted on the inner surface of one of the standards for engaging the thread, to secure advancement of the tail arbor when it is rotated, a tail chuck journaled on the tail arbor, a motor mounted on the bed, a head chuck cooperating with the tail chuck in gripping a piece of fruit, and means for rotating the head chuck from the motor.

2. In a machine for rotating citrus fruit during the removal of the outer bitter cells thereof, a bed, a tailstock secured to the bed and comprising standards and a spacer imposed between the standards, a tubular bearing mounted in the standards and having an opening, a tail arbor mounted to rotate at the will of an operator in the bearing and having a thread, a follower secured to one standard and having a finger which is laterally inclined to conform to the pitch of the thread, the finger extending into the opening, into engagement with convolutions of the thread, a tail chuck journaled on the tail arbor, a head chuck cooperating with the tail chuck in gripping a piece of fruit, and means for rotating the head chuck.

3. In a machine for rotating citrus fruit during the removal of the outer bitter cells thereof, a bed, a tailstock secured to the bed and comprising standards and a spacer interposed between the standards, tightening devices connecting the standards and binding them against the ends of the spacer, the tightening devices being disposed on opposite sides of the spacer, in contact therewith, a tubular bearing mounted in the standards and having an opening, a tail arbor mounted to rotate at the will of an operator in the bearing and having a thread, a follower secured to one standard and having a finger which is laterally inclined to conform to the pitch of the thread, the finger extending into the opening and engaging the thread, the finger being provided in its lower edge with a notch, engaging the tail arbor, between adjacent convolutions of the thread, a tail chuck journaled on the tail arbor, a motor mounted on the bed, a head chuck cooperating with the tail chuck in gripping a piece of fruit, and means for rotating the head chuck from the motor.

4. In a machine for rotating citrus fruit during the removal of the outer bitter cells thereof, a bed, a headstock and a tailstock secured to the bed; each stock comprising standards, a spacer between the standards, and tightening devices connecting the standards and holding them against the ends of the spacer, the tightening devices engaging opposite surfaces of the spacer: a tail arbor movable in the standards of the tail stock and having a threaded portion, means on the tail stock and cooperating with the threaded portion to secure advancement of the tail arbor when it is rotated at the will of an operator, a tail chuck journaled on the tail arbor, a head arbor mounted to rotate in the standards of the head stock, a head chuck secured to the head arbor for rotation therewith and cooperating with the tail chuck in gripping a piece of fruit, and means for rotating the head arbor.

5. In a machine for rotating citrus fruit during the removal of the outer, bitter cells thereof, a bed, a headstock mounted on the bed and comprising standards, anti-friction bearings comprising inner and outer rings, the outer rings being secured to the standards, a head arbor secured in the inner rings of the bearings and having shoulders engaging the inner rings, to prevent the head arbor from moving longitudinally, a tightening device connecting the standards, a spacer interposed between the standards, to prevent them from binding on the adjacent ends of the inner rings of the bearings, under the impulse of the tightening device, a head chuck secured to the head arbor, for rotation therewith, means for rotating the head arbor, a tailstock mounted on the bed, a tail arbor mounted in the tailstock for advancement and retraction, and a tail chuck mounted on the tail arbor for rotation thereon, and cooperating with the head chuck in gripping a piece of fruit.

6. In a machine for rotating citrus fruit during the removal of the outer, bitter cells thereof, a bed, a tailstock secured to the bed and comprising standards, a spacer disposed between the standards, tightening devices connecting the standards and binding them against the ends of the spacer, the tightening devices being disposed on opposite sides of the spacer, in contact therewith, a tail arbor carried by the standards for rotation, and having a thread, means mounted on the inner surface of one of the standards for engaging the thread, to secure advancement of the tail arbor when it is rotated, a tail chuck journaled on the tail arbor, a head chuck cooperating with the tail chuck in gripping a piece of fruit, and means for rotating the head chuck.

7. In a machine for rotating citrus fruit during the removal of the outer bitter cells thereof, a bed, a tailstock secured to the bed and comprising standards and a spacer interposed between the standards, tightening devices connecting the standards and binding them against the ends of the spacer, the tightening devices being disposed on opposite sides of the spacer, in contact therewith, a tubular bearing mounted in the standards and having an opening, a tail arbor mounted to rotate at the will of an operator in the bearing and having a thread, a follower secured to one standard and having a finger which is laterally inclined to conform to the pitch of the thread, the finger extending into the opening and engaging the thread, the finger being provided in its lower edge with a notch, engaging the tail arbor, between adjacent convolutions of the thread, a tail chuck journaled on the tail arbor, a head chuck cooperating with the tail chuck in gripping a piece of fruit, and means for rotating the head chuck.

8. In a machine for rotating citrus fruit during the removal of the outer, bitter cells thereof, a bed, a tailstock secured to the bed and comprising standards, a spacer disposed between the standards, tightening devices connecting the standards and binding them against the ends of the spacer, the tightening devices being disposed on opposite sides of the spacer, in contact therewith, a tail arbor carried by the standards for rotation, and having a thread, means mounted on the inner surface of one of the standards for engaging the thread, to secure advancement of the tail arbor when it is rotated, a tail chuck journaled on the tail arbor, a motor mounted on the bed and including a shaft, gearing assembled with the motor shaft and including a shaft disposed substantially at right angles to the motor shaft, and a head chuck cooperating with the tail chuck in gripping a piece of fruit, the head chuck being mounted directly on the shaft of the gearing.

DAVID L. ELLIS.